US012789276B2

(12) United States Patent
Chasse et al.

(10) Patent No.: US 12,789,276 B2
(45) Date of Patent: Nov. 10, 2026

(54) FABRICATION WORKSTATION AND LAYOUT DEVICE

(71) Applicants: Stephen L. Chasse, Hudson, NH (US); John Michael Evans, Seabrook, NH (US)

(72) Inventors: Stephen L. Chasse, Hudson, NH (US); John Michael Evans, Seabrook, NH (US)

( * ) Notice: Subject to any disclaimer, the term of this patent is extended or adjusted under 35 U.S.C. 154(b) by 176 days.

(21) Appl. No.: 17/396,352

(22) Filed: Aug. 6, 2021

(65) Prior Publication Data

US 2023/0038040 A1 Feb. 9, 2023

(51) Int. Cl.
*B23K 9/007* (2006.01)
*B23K 101/28* (2006.01)

(52) U.S. Cl.
CPC .......... *B23K 9/007* (2013.01); *B23K 2101/28* (2018.08)

(58) Field of Classification Search
CPC .... B23K 9/007; B23K 2101/28; B23K 37/04; B23K 37/0408; B23K 37/0461
USPC ..................... 219/148, 137 PS, 68, 158, 162
See application file for complete search history.

(56) References Cited

U.S. PATENT DOCUMENTS

| | | | |
|---|---|---|---|
| 3,888,169 | A | 6/1975 | McNaughton |
| 4,014,520 | A | 3/1977 | Walters |
| 4,359,897 | A | 11/1982 | Ugo |
| 4,364,330 | A | 12/1982 | Pearl |
| 4,514,899 | A | 5/1985 | Burger |
| 4,900,379 | A | 2/1990 | Chapman |
| 5,046,015 | A | 9/1991 | Dasher et al. |
| 5,144,330 | A | 9/1992 | Bennett |
| 5,388,318 | A | 2/1995 | Petta |
| 5,873,567 | A | 2/1999 | Williams |
| 6,145,212 | A | 11/2000 | Geise et al. |
| 6,170,163 | B1 | 1/2001 | Bordignon et al. |
| 6,222,155 | B1 | 4/2001 | Blackmon et al. |

(Continued)

FOREIGN PATENT DOCUMENTS

| | | | |
|---|---|---|---|
| CN | 202965761 U | * | 6/2013 |
| CN | 205768225 U | * | 12/2016 |

(Continued)

OTHER PUBLICATIONS

Machine translation of CN 210633759 performed on Jul. 21, 2023.*

(Continued)

*Primary Examiner* — Elizabeth M Kerr
*Assistant Examiner* — Alba T Rosario-Aponte
(74) *Attorney, Agent, or Firm* — Secant IP, P.L.L.C.

(57) ABSTRACT

Techniques and devices are disclosed for fabrication workstation and assembly layout device. The fabrication workstation includes a table with a work surface. The work surface being a continuous surface and configured to support a plurality of components for fabrication of an assembly, such as an assembly of metal components. The device further includes a beam located above the work surface. The beam is operatively coupled to the table, such that the beam moves relative to the work surface in a first direction. A marking device on the beam is configured to move along the beam in a second direction different from the first direction. The marking device is further configured to mark the work surface in the shape of an assembly pattern. Assembly components are positioned on the assembly pattern to be assembled.

9 Claims, 11 Drawing Sheets

(56) References Cited

U.S. PATENT DOCUMENTS

| | | | |
|---|---|---|---|
| 6,317,980 B2 | 11/2001 | Buck, III | |
| 6,731,991 B1 | 5/2004 | Michalski et al. | |
| 6,732,836 B2 | 5/2004 | Ono | |
| 7,621,053 B2 | 11/2009 | Bianchin | |
| 9,840,090 B2 | 12/2017 | Dupre et al. | |
| 10,150,131 B2 | 12/2018 | Giusti et al. | |
| 10,576,588 B2 | 3/2020 | Chasse et al. | |
| 11,426,826 B2 | 8/2022 | Chasse et al. | |
| 12,017,308 B2 | 6/2024 | Chasse et al. | |
| 2005/0056215 A1 | 3/2005 | Shimoda | |
| 2005/0151818 A1 | 7/2005 | Ozawa | |
| 2009/0211469 A1 | 8/2009 | Kalmthout | |
| 2010/0064956 A1 | 3/2010 | Long et al. | |
| 2011/0011222 A1 | 1/2011 | Bales | |
| 2012/0013661 A1 | 1/2012 | Smelser | |
| 2012/0042794 A1 | 2/2012 | Tran | |
| 2014/0020485 A1 | 1/2014 | Tran et al. | |
| 2015/0251267 A1 | 9/2015 | Winn et al. | |
| 2016/0008835 A1 | 1/2016 | Giusti et al. | |
| 2016/0176003 A1 | 6/2016 | Reckevicius et al. | |
| 2016/0270504 A1 | 9/2016 | Miyamoto | |
| 2017/0334193 A1 | 11/2017 | Voina | |
| 2018/0147658 A1 | 5/2018 | Shapiro | |
| 2018/0150058 A1 | 5/2018 | Shapiro | |
| 2018/0281121 A1 | 10/2018 | Tinsley | |
| 2018/0326525 A1 | 11/2018 | Ann et al. | |
| 2019/0070697 A1* | 3/2019 | Chasse | B23K 9/0026 |
| 2020/0164473 A1* | 5/2020 | Chasse | B05B 13/04 |
| 2021/0046590 A1 | 2/2021 | Chasse et al. | |
| 2021/0141362 A1* | 5/2021 | Cramer | G05B 19/40938 |
| 2022/0350302 A1 | 11/2022 | Donner | |

FOREIGN PATENT DOCUMENTS

| | | | | |
|---|---|---|---|---|
| CN | 210633759 U * | 5/2020 | | |
| EP | 2927389 B1 | 2/2016 | | |
| WO | 2007113250 A1 | 10/2007 | | |
| WO | 2015155155 A1 | 10/2015 | | |
| WO | 2017073947 A1 | 5/2017 | | |
| WO | WO-2021116809 A1 * | 6/2021 | B23K 26/082 | |

OTHER PUBLICATIONS

Machine translation of CN 205768225 performed on Jul. 21, 2023.*

Messer Cutting Systems, Inc., "The Edgemax Precision Cutting System" (2015).

Rolled Alloys, Inc., "Plate and Sheet Flatness," https://www.rolledalloys.com/technical-resources/blog/plate-and-sheet-flatness (retrieved Aug. 10, 2017).

Fay Industries, Inc., Saw Cutting Website, "Standard Structural Sizes," available at http://steelandsaw-cutting. fayindustries.com/item/structural-steel/hr-a36-channels-standard-structural-sizes/c8-x-11-5 (retrieved Aug. 10, 2017).

Steel Tube Institute, HSS: Technical Brochure, "Hollow Structural Sections, Dimension and Section Properties Astm A1085" (2013).

Wittenstein Alpha GmbH, Product Catalog 2016/2017 (2016).

Beckhoff Drive Technology, "Synchronous Servomotor AM8000 and AM8500," Version: 2.2, (Jun. 25, 2014).

Beckhoff New Automation Technology, "CP72xx "Economy" Panel PC" available at https://www.beckhoff. com/english.asp?industrial_pc/cp72xx.htm (accessed Jul. 19, 2017).

Beckhoff New Automation Technology, "Installation and Operating Instructions for 'Economy' Panel PC CP72xx," Version: 2.0 (Nov. 9, 2016).

Toolbotics, Tooli G2, Internet Archive Wayback Machine, available at https://web.archive.org/ web/20170827183730/http://www.toolbotics.com (Aug. 27, 2017).

Dispenseworks, "Robotic Dispenser Applications 2," Internet Archive Wayback Machine, available at https://web. archive.org/ web/20170118061701 /http://dispenseworks.com/ AppBulletins2012/dw_APPLICATION_line_card_all.pdf (Jan. 18, 2017).

Mike Lyon, "Joel Large Scale Pen and Ink Drawing in White and Black Ink on Tinted Paper," Internet Archive Wayback Machine, available at https://web.archive. org/web/20160508124331 /http://mlyon.com/2011 /joel-large-scale-pen-and-ink-drawing-in-white-and-black-ink-on-tinted-paper (May 8, 2016).

Lincoln Electric, "Operator's Manual Torchmate Classic 4x8," Internet Archive Wayback Machine, available at https://web.archive.org/web/20170807101159/http://torchmate.com/uploads/downloads/Torchmate-4x8-Classic-Assembly-Guide.pdf (Jul. 8, 2015).

Maker Table, "CNC Plasma Table Build Day Ten: Gear Rack & Mount Motors," available at <https://www.youtube.com/watch?v=pDeUuDXll0g (Dec. 9, 2016).

Vicon, "Monarch Plasma Cutting Table" Internet Archive Wayback Machine, available at http://www.plasma-automation.com/Machinery/Plasma-Cutting/Monarch-Heavy-Duty-Precision-Plasma-Cutter.php (Jun. 28, 2017).

Sai Weld India, "ArtMaster CNC Plasma Table Cutting Machine," available at http://www.plasmaconsumable.in/cnc-plasma-table-cutting-machine.html (Jul. 18, 2017).

Thomas Stacey, "Time Lapse Railing," available at https://www.youtube.com/watch?v+Pneb3JLsZEA (May 22, 2012).

wade'o design.com, "CNC Router Build," Internet Archive Wayback Machine, available at https://web.archive.org/web/20170418052710/https://www.wadeodesign.com/design-details.html (Apr. 18, 2017).

Chaneman99, "CNC Layout Tool, " https://www.youtube.com/watch?v=e97Y14MNGf, pp. 1-10 (Jul. 13, 2016).

Techno Cnc Systems, "NK105G2 Plasma User Manual," http://support.technocnc.com/pdf /Tech no-CNC-2Plasma-NKI 05G2.pdf pp. 1-40 (Mar. 2016) (retrieved from the Internet Archive Wayback Machine, https://web.archive.org/web/20160804181147/ http://support.technocnc.com/pdf/Techno-CNC-Plasma-NKI 05G2.pdf).

Ota Neuzil, "CNC Airbrush Machine," https://www.youtube.com/watch?v=PIWX-pQsZs, pp. 1-5 (Jul. 9, 2013).

Rockcliff Machine Inc. Web Page, https://www.rockcliffmachine.com, pp. 1-2 (Jul. 11, 2017) (retrieved from the Internet Archive Wayback Machine, https://web.archive.org/web/20170711015425/https://www.rockcliffmachine.com/).

Torchmate.com, "Operator's Manual Torchmate Classic 4x8," http://torchmate.com/uploads/downloads/Torchmate-4x8-Classic-Assembly-Guide.pdf, pp. 1-99 (Jul. 8, 2015) (retrieved from the Internet Archive Wayback Machine, https://web.archive.org/web/20170807101159/http://torchmate.com/uploads/downloads/Torchmate-4x8-Classic-Assembly-Guide.pdf).

Catanese, P. & Geary, A., "Post-Digital Printmaking: CNC, Traditional and Hybrid Techniques," pp. 119-128, ISBN 978-1408124949 (A&C Black, 2012).

Peddinghaus, "Automatic Layout Marking I PeddiWriter (Future of Layout Marking)," available at https://www.youtube.com/watch?=74wN9MpvjrU (Dec. 2, 2014).

Peddinghaus, JT Steel I Fabtech I Peddi-TV, "PeddiWriter Handrail Fabrication I," available at https://www.tube.com/ watch?v=5pDNX_PeceY, Nov. 14, 2016 (Nov. 14, 2016).

Kingmetalsinc, "Welding Iron Railings for Beginners," available at https://www.youtube.com/watch?v=loGUdAz4EAM (Sep. 25, 2012).

Mr. Figureitout, "Welding Handrail, Tips for Beginners," available at https://www.youtube.com/watch?v=aBGSVXKAKQY (Nov. 13, 2019).

American Welding Society Forum, "Is There Any Money in Railing Jobs?," available at https://app.aws.org/forum/topic_show.pl?tid=32291 (Jun. 23, 2013).

American Welding Society Forum, "Welding Table Top Thickness," available at https://app.aws.org/forum/topic_showpl?tid=32253 (Jun. 13, 2013).

Poulsen, Matthew A., "Concise Description of Relevance," 3rd Party Submission Under 37 CFR 1.290 filed in U.S. Appl. No. 16/775,848 (Jan. 13, 2021).

Amended Answer and Counterclaim, *Automated Layout Technologies, LLC* v. *Precision Steel Systems, LLC*, case No. 4:20-cv-3127 (D. Ne, Feb. 12, 2021).

Suiter Swantz PC, Request for Ex Parte Reexamination under 37 CFR § 1.510, U.S. Pat. No. 10,576,588 (Feb. 25, 2021).

(56) References Cited

OTHER PUBLICATIONS

Poulson, Matthew A., Request for Ex Parte Reexamination Under 37 CFR 1.510, U.S. Pat. No. 10,576,588 (filed Aug. 30, 2021) (exhibits omitted).
Poulson, Matthew A., Request for Ex Parte Reexamination Under 35 CFR 1.510, U.S. Pat. No. 10,576,588 (filed Jun. 2, 2021) (exhibits omitted).
Richard P. Jeffries, Letter to Counsel (Sep. 30, 2021).
Declaration of Nicholas Donner, (Jan. 9, 2023).
Suiter Swantz PC, Request for Ex Parte Reexamination, (Jan. 11, 2023).
Craig R. Smith, Plaintiff's Motion For Preliminary Injunction Before Apr. 12, 2023 (Jan. 13, 2023).
Craig R. Smith, Memorandum in Support of Motion for Preliminary Injunction Before Apr. 12, 2023 (Jan. 13, 2023).
Craig R. Smith, Index of Evidence in Support of Plaintiff's Motion for Preliminary Injunction Before Apr. 12, 2023 (Jan. 12, 2023).
Stephen L. Chasse, Declaration of Stephen L. Chasse in Support of Plaintiff's Motion for Preliminary Injunction, With Exhibits (Jan. 13, 2023).
Craig R. Smith, Declaration of Craig R. Smith in Support of Plaintiff's Motion for Preliminary Injunction, With Exhibits (Jan. 13, 2023).
Craig R. Smith, Plaintiff's Reply in Support of Motion for Preliminary Injunction (Feb. 10, 2023).
Craig R. Smith, Index of Evidence in Support of Plaintiff's Motion for Preliminary Injunction Before Apr. 12, 2023 (Feb. 10, 2023).
Craig R. Smith, Declaration of Craig R. Smith in Support of Plaintiff's Motion for Preliminary Injunction, With Exhibits (Feb. 10, 2023).
Nathan D. Clark, Letter to ALT Attorneys (Feb. 27, 2023).
Nicholas Donner, Declaration of Nicholas Donner, With Exhibits (Feb. 2, 2023).
Donald Volentine, Declaration of Donald Volentine, With Exhibits (Feb. 2, 2023).
Nicholas Grennan, Declaration of Nicholas Grennan, With Exhibits (Feb. 2, 2023).
Nathan Clark, Declaration of Nathan Clark, With Exhibits (Feb. 2, 2023).
Memorandum and Order, *Automated Layout Technologies LLC* v. *Precision Steel Systems LLC*, 4:20-cv-03127 (D. NE, Apr. 11, 2023).
Clark, Nathan D., Letter forwarding Memorandum and Order, (Apr. 12, 2023).
Arcsoft USA, Mach3 CNC Controller Software Installation and Configuration, Version 3 (Nov. 6, 2008).
Precision Steel Systems, PLS 624 by Precision Steel Systems, https://www.precisionsteelsystems.com, (Oct. 22, 2020).

* cited by examiner

FABRICATION WORKSTATION AND LAYOUT DEVICE

FIELD OF THE DISCLOSURE

This disclosure relates to devices and methods used in the fabrication of articles, and more particularly to a workstation used to create layouts that guide fabrication of an assembly.

BACKGROUND

Some articles of manufacture are fabricated using manual techniques. For example, conventional techniques used to fabricate railings include laying out individual pieces of a railing by hand onto a surface, such as a table or floor. Measurements of the individual pieces relative to one another are taken to ensure that the pieces are properly positioned. These measurements can be done using tape measures, rulers, and protractors, so that the pieces can be attached to one another in a particular manner or design. The pieces may be arranged according to a plan and held together temporarily using clamps and/or jigs. With the various pieces laid out, one can view the assembly and make changes to the position of individual railing pieces before they are attached together.

SUMMARY

One aspect of the present disclosure is directed to a fabrication workstation. In one embodiment, the fabrication workstation includes a table with a base and a steel work surface on the base. The steel work surface is sized and configured to support a plurality of metal components for fabrication of a metal assembly. Rails extend along opposite sides of the table. A beam located above the steel work surface extends between and is fixed to beam supports each having a lower end movably engaging one of the rails. A marking device is attached to the beam and is configured to move along the beam and mark the steel work surface. A first motor is operable to move the marking device along the beam and a second motor is operable to move the beam along the table. A workstation controller is configured to operate the first and second motors to move the marking device relative to the steel work surface to mark the steel work surface with an assembly pattern. An electrical cabinet is on the beam, the electrical cabinet being configured to receive control signals from the workstation controller and output power to the first and second motors.

In some embodiments, the steel work surface has a length of at least 10 feet, such as at least 15 feet, at least 20 feet, at least 25 feet, or 30 feet.

In some embodiments, the fabrication workstation further comprises a plurality of adjustors attached to the table, where each adjustor is configured to adjust a position of one of the rails along the table.

In some embodiments, the fabrication workstation includes a grounding lug configured to receive electrical energy via the steel work surface and transfer the electrical energy to ground.

In some embodiments, the marking device is selected from a print head, an ink dispenser, and an ink marker.

In some embodiments, the assembly pattern is a first assembly pattern and the marking device is configured to deposit ink onto the steel work surface in a second assembly pattern overlaying the first assembly pattern.

In some embodiments, the workstation controller is further configured to move the marking device relative to the steel work surface to mark the steel work surface with a second assembly pattern. For example, the second assembly pattern is deposited on the steel work surface after removing the first assembly pattern, or so that both the first and second assembly patterns coexist on the steel work surface.

In some embodiments, the electrical cabinet contains one or more servo motor controllers electrically coupled to the first and second motors and to the workstation controller.

In some embodiments, the fabrication workstation includes a flexible cable conduit below the table.

In some embodiments, the electrical cabinet is wired for use with a line voltage from 200 volts to 250 volts.

In some embodiments, the metal fabrication workstation further comprises a flexible electrical conduit below the steel work surface, the flexible electrical conduit housing electrical cable suitable for connection to a line voltage from 200-250 volts.

Another aspect of the present disclosure is directed to a method of metal fabrication. In one embodiment, the method comprises providing a workstation comprising a table including a base and a steel work surface on the base, the steel work surface sized and configured to support a plurality of metal assembly components; a beam located above and extending over the steel work surface, the beam extending between and attached to beam supports on opposite sides of the table and each having a lower end movably engaging the table; a marking device attached to the beam and configured to move along the beam; one or more motors operable to move the marking device relative to the steel work surface; a controller configured to operate the one or more motors to move the marking device relative to the steel work surface and to mark the steel work surface with an assembly pattern; and an electrical cabinet on the beam, the electrical cabinet configured to receive control signals from the controller and output power to the one or more motors; and marking the steel work surface, using the marking device, with an assembly pattern for the plurality of metal assembly components.

In some embodiments, marking the steel work surface includes the marking device moving while in direct contact with the steel work surface.

In some embodiments, the method further comprises moving the marking device in a vertical direction into contact with the steel work surface.

In some embodiments, the method further comprises removing the assembly pattern from the steel work surface; and marking the steel work surface with a second assembly pattern. For example, removing the assembly pattern includes polishing the steel work surface.

In some embodiments, the assembly is a first assembly pattern and the method further comprises marking the steel work surface, using the marking device, with a second assembly pattern, positioning a second plurality of metal assembly components on the second assembly pattern on the steel work surface, and attaching the second plurality of metal assembly components to one another on the steel work surface to form a second assembly.

In some embodiments, the method further comprises positioning metal assembly components on the steel work surface according to the assembly pattern and attaching the metal assembly components to one another on the steel work surface to form an assembly. For example, attaching the metal assembly components to one another includes welding together the metal assembly components.

In some embodiments, positioning metal assembly components includes positioning metal railing components, and wherein attaching the metal assembly components includes welding together the metal railing components.

In some embodiments, marking the steel work surface includes defining at least part of an outline of a metal assembly to be assembled.

In some embodiments, the metal assembly to be assembled comprises a railing, providing the assembly pattern includes providing an outline of at least part of the railing on the steel work surface, and positioning the plurality of metal assembly components includes positioning railing pieces within the outline.

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes and not to limit the scope of the inventive subject matter.

Figure 1A:
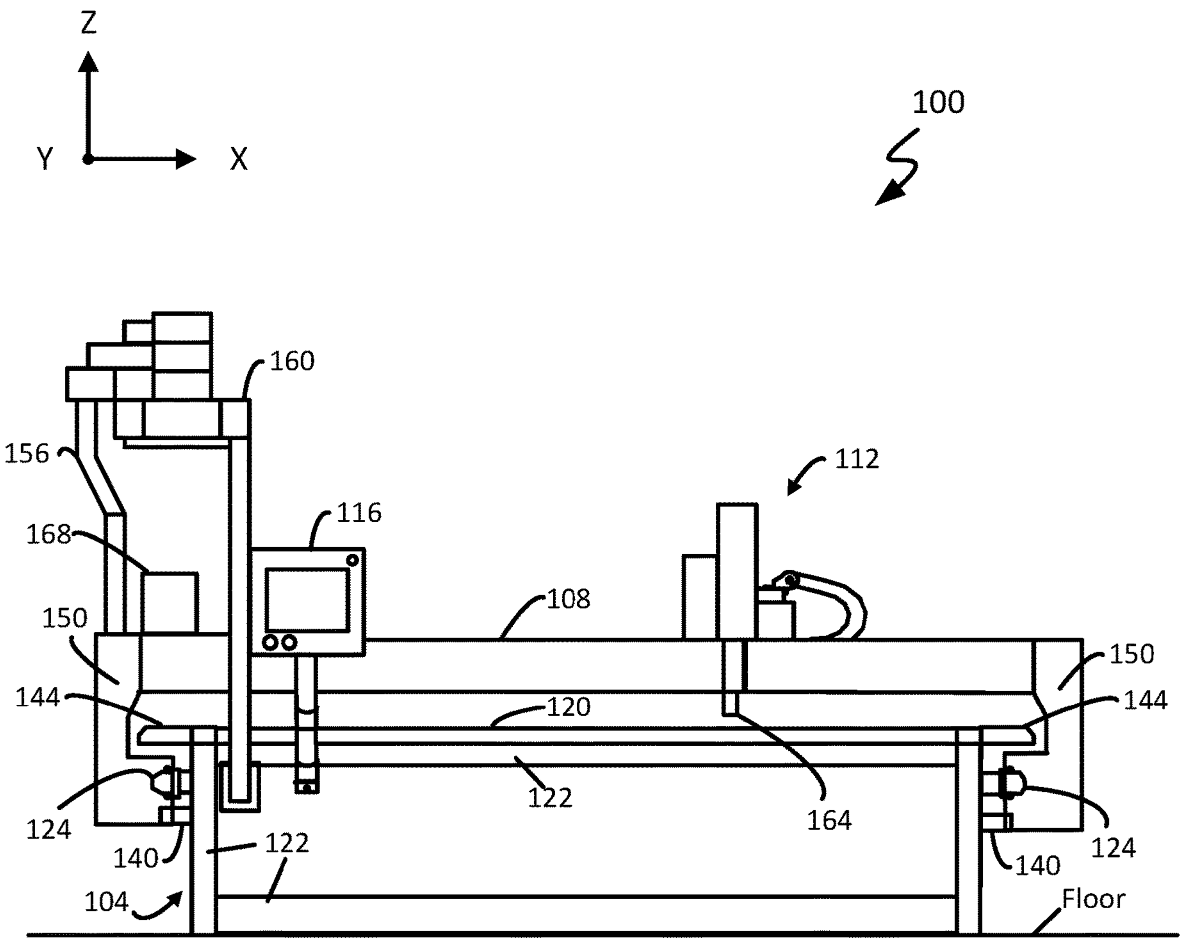
FIG. 1A is an end view of a fabrication workstation configured in accordance with an embodiment of the present disclosure.

These and other features of the present embodiments will be understood better by reading the following detailed description, taken together with the figures herein described. The accompanying drawings are not intended to be drawn to scale. For purposes of clarity, not every component may be labeled in every drawing.

DETAILED DESCRIPTION

Techniques and devices are disclosed for a fabrication workstation and methods of fabricating a metal assembly. The fabrication workstation includes a table with a continuous work surface on which an assembly pattern (e.g., an outline of a railing) is provided to guide fabrication of a structure to be assembled. By marking the metal work surface with the assembly pattern, components of the metal assembly can be quickly and easily aligned prior to securing the assembly components (e.g., by welding) without the necessity of taking multiple measurements to ensure proper positioning of the railing pieces. In addition, the assembly pattern provides a visual cue to ensure the railing pieces are properly positioned relative to one another prior to assembling them.

In some embodiments, the assembly pattern is marked directly on a metal work surface with a marking device that is supported on a beam located above the work surface. The beam is configured to move relative to the work surface in a first direction (e.g., in the y-direction). The marking device is configured to move along the beam in a second direction (e.g., in the x-direction) different from the first direction. As the marking device moves along the work surface (e.g., in the x-direction or y-direction or both) ink is deposited onto the work surface of the table in the pattern of the desired assembly. Once the pattern is completed, the assembly components can be quickly positioned on the work surface according to the assembly pattern and attached to one another. Once the assembly is fabricated, the assembly pattern can be easily removed from the work surface by hand (or by mechanical device) to ready the work surface to receive another assembly pattern for the next assembly to be assembled.

General Overview

As described above, fabrication of metal railings, stairs, and other structures is a time consuming and expensive process. Often, the same measurement is taken multiple times to ensure that the layout is accurate and no movement between pieces has occurred since the previous measurement. Movement of any one of the railing pieces can cause several other railing pieces to be improperly located, and thereby cause significant re-work of the layout and/or railing assembly itself. In some instances, an entire railing assembly is scrapped and remade because the railing pieces were misaligned prior to joining them together.

Thus, and in accordance with an embodiment of the present disclosure, techniques and devices are disclosed for a fabrication workstation and methods of fabricating a railing assembly. In some embodiments, the fabrication workstation is a metal fabrication workstation and includes a table with a continuous work surface on which a railing pattern is provided to guide fabrication of a metal railing assembly. A continuous work surface is a surface that does not include seams, openings, or holes within the surface that would prevent the formation of the railing pattern thereon. For example, in one embodiment, the work surface is a sheet of carbon steel in the form of a rectangular cuboid having a length of y, a width of x, and height of z. A railing pattern can be any group of markings that when deposited or otherwise placed on the work surface indicate particular arrangement of components (e.g., railing pieces) to form the assembly (e.g., a railing). In some examples, the assembly pattern is an outline or a line diagram of a portion of or an entire assembly. The size of the assembly pattern may be proportional to the actual size of the completed assembly so that assembly components can be positioned onto the assembly pattern relative to one another to form the assembly. In some examples, the assembly pattern has dimensions that are equal to or substantially similar to actual dimensions of the assembly to be fabricated. In other examples, the assembly pattern may include dimensions that are slightly larger than the actual railing assembly to be fabricated so that the assembly pattern can still be seen while the railing pieces are positioned along the pattern. By using an assembly pattern that is proportional to the actual size of the assembly, the time for laying out a railing assembly can be reduced from a few hours to less than one half hour, for even complex or ornamental patterns.

In some examples, the work surface is configured to support a plurality of metal components along with other tooling or jigs used to position the individual components while they are assembled together on the work surface. In some examples, the work surface is one single piece of material, such as a plate of carbon steel, that can be reused multiple times to create different assemblies, as will be described further herein. In other examples, the work surface is manufactured from multiple pieces that are attached to one another such that the surface has a flatness, size, and other physical properties similar to one made from a single continuous sheet, for example. The work surface, in some examples, is sized to allow two or more assemblies to be fabricated thereon simultaneously. In some such examples, the fabrication workstation can deposit two or more assembly patterns onto the work surface either simultaneously or one after another. For example, as a single marker moves across the work surface, it marks the work surface in a given region with nearby or overlapping portions of more than one assembly pattern. In some embodiments, the different assembly patterns can be distinguished from one another by use of different line types, indicators along lines (e.g., hash mark, dot, etc.), or some other technique. With the assembly patterns provided on the work surface, multiple fabricators can work at the table to create multiple assemblies at one time. In some examples, the table further includes a grounding lug, so that fabricators can safely weld together metal components while the components are positioned on the work surface. The grounding lug is configured to receive electrical energy (e.g., an arc strike) via the work surface and transfer that electrical energy safely to ground, thereby preventing harm to fabricators or equipment on or near the table. Thus, welding operations can be safely conducted on the work surface.

In some examples, the fabrication workstation further includes a beam located above the work surface. The beam is configured to support a marking device, such as an ink marker or ink dispenser, and guide the marking device relative to the work surface in a first direction (e.g., in the y-direction). In one example, the beam is operatively coupled to the table, such that the beam is moved along the guide rails located on opposing sides of the table using a combination of motors and drive mechanisms. The movement of the beam is controlled using one or more encoders. The beam is also configured to allow the marking device to move along the beam in a second direction (e.g., an x-direction), as described further herein. Thus, the marking device can move in two directions relative to the work surface, enabling the marking device to deposit ink at coordinate locations (e.g., (x, y) coordinates) directly on the work surface.

The marking device is configured to deposit ink onto the work surface of the table in the form of an assembly pattern. In one example, the marking device is an ink dispensing system that includes a movable nozzle configured to move linearly in a vertical direction relative to the work surface (e.g., a z-direction). The moveable nozzle can be actuated, for example by air or hydraulic pressure, so that the nozzle is positioned at a distance from the work surface so that ink can be deposited on the surface in a clear and define manner (i.e., not blurry or appearing diffuse). The ink dispenser system also includes an ink reservoir configured to hold a supply of ink that can be transferred to the nozzle, for example using a fluid pump. The ink dispenser system can be slidably attached to the beam so that the nozzle can be positioned laterally along a length of the beam.

In an embodiment of the present disclosure, methods for fabricating an assembly using the fabrication workstation are disclosed. The method includes providing a first pattern of the assembly directly on a work surface of a table. The first pattern can be selected using a graphical user interface (GUI) displayed within a touch screen display of a control panel. The pattern can be selected from a database of assembly patterns or imported from another application (e.g., a Computer-Aided Drawing (CAD) software application). Thus, standard or custom assembly patterns can be selected, depending on a given application. With the pattern selected, the fabrication workstation can be operated using the control panel to dispose the first assembly pattern onto the work surface of the table.

In some examples, the method further includes positioning a plurality of assembly components along the first assembly pattern on the work surface. In one example, the assembly pattern is a railing pattern in the form of an outline of an actual size railing assembly. The railing pieces are positioned relative to one another within the outline so that each railing piece is surrounded or otherwise enclosed by the pattern. The railing pattern provides a visual cue regarding the proper positioning of each railing piece. Thus, measurements between railing pieces are not needed because the position of each piece relative to adjacent pieces is defined by the pattern. In other examples, the railing pattern can be a line diagram of the railing assembly or can be a collection of markings (e.g., crosses or corner markings) that indicate points of intersection and/or other critical locations. Such marking approach can use less ink than marking with solid lines, can reduce time to remove the assembly pattern from the work surface, and can increase the speed of marking the work surface with the assembly pattern, in accordance with some embodiments. In some embodiments, some physical measurements may need to be taken to properly position one or more of the railing pieces and, thus, some examples of the method include taking and marking physical measurements.

In some examples, the method also includes attaching the positioned assembly components to one another to form the assembly. In one example, the components are manufactured from metal, such as cast iron or carbon steel, and attached to each other using fabrication techniques, such as welding. The assembly can be partially or completely assembled while the component pieces are positioned on the work surface. The method may further include removing the first pattern from the work surface. The first pattern is removed from the work surface so that subsequent patterns can be provided thereon. The pattern can be removed by hand or with a mechanical device (e.g., a hand-drill with a polishing wheel) using a polishing compound or detergent based cleaner. Optionally, the workstation includes a buffer tool, a solvent-moistened cleaning pad, or other tool that can take the place of the marking device and then moved along the beam to remove the assembly pattern (or part of it) from the work surface.

Although referred to herein as a fabrication workstation, the disclosed fabrication workstation is not limited to that particular terminology and alternately may be referred to as a fabrication layout device, a layout table, an assembly layout table, or other terms. Numerous variations and embodiments will be apparent in light of the present disclosure.

Example Fabrication Workstation

Figure 1B:
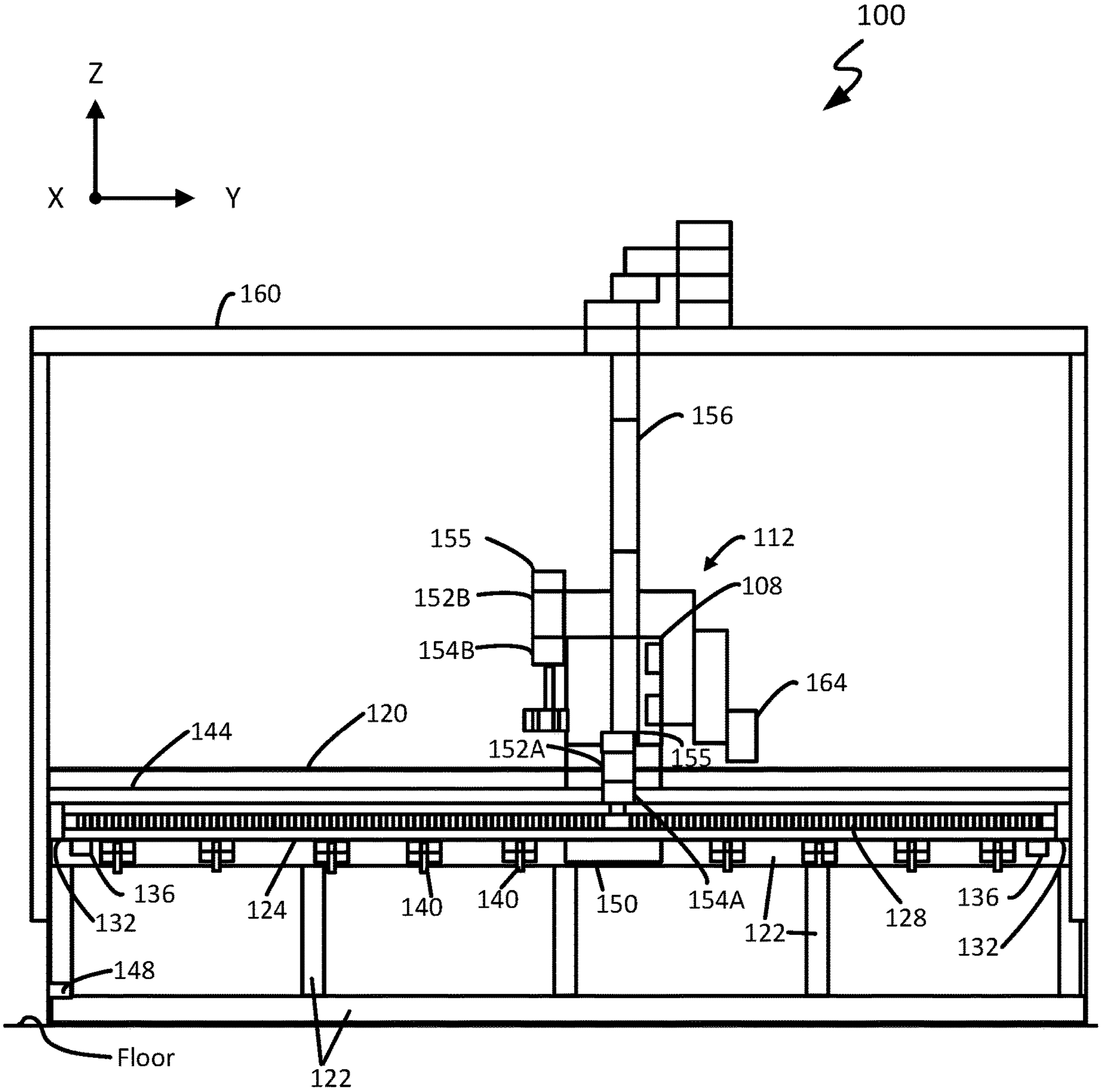
FIG. 1B is a side view of a fabrication workstation of FIG. 1A, in accordance with an embodiment of the present disclosure.
Figure 1C:
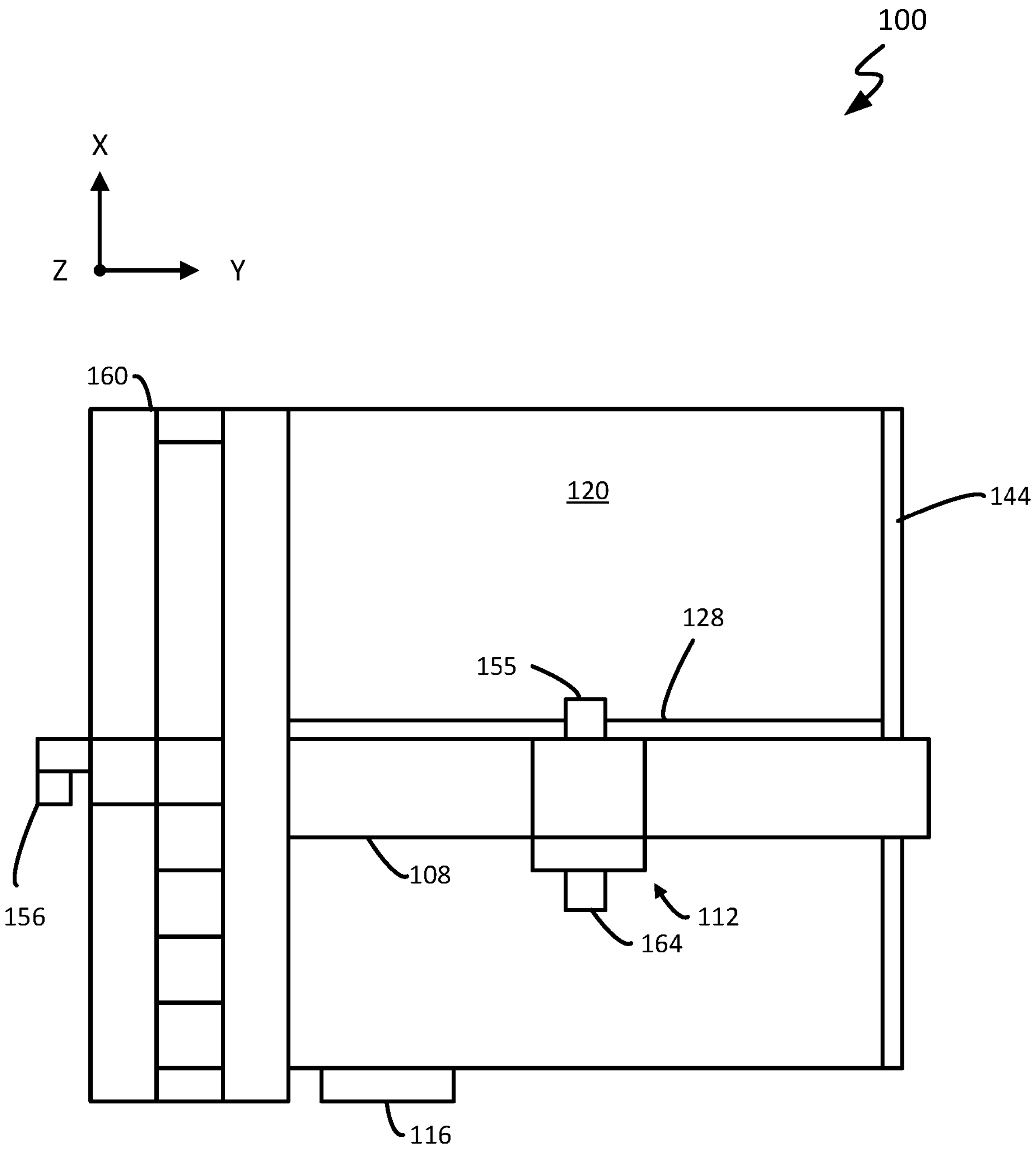
FIG. 1C is a top view of a fabrication workstation of FIG. 1A, in accordance with an embodiment of the present disclosure.

FIG. 1A is an end view of a fabrication workstation 100, in accordance with an embodiment of the present disclosure. FIG. 1B is a side view of a fabrication workstation 100. FIG. 1C is a top view of a fabrication workstation 100. The fabrication workstation 100 includes a table 104, a beam 108, an ink dispenser system or marking device 112, and a control panel 116.

The table 104 is a rigid structure that does not flex when a load of up to 1000 lbs. is applied to it. This feature enables railing components to be laid out relative to one another on the table 104 prior to forming a railing assembly from the railing components. Flexing of the table 104 can cause the pattern deposited thereon to be improperly shaped and/or can affect the positioning or alignment of railing pieces positioned thereon. In addition, the table 104 is designed to support railing components, tooling, and even fabricators as the individual components are physically joined to one another. Note, due to the table's robust design and construction the table 104 can weigh as much as 9,000 pounds. In one example, the table 104 includes a work surface 120, a base 122, guide rails 124, adjustors 140, guards 144, a grounding lug 148, beam supports 150, motors 152A and 152B, gear boxes 154A and 154B, and cable tray 160.

Figure 2A:
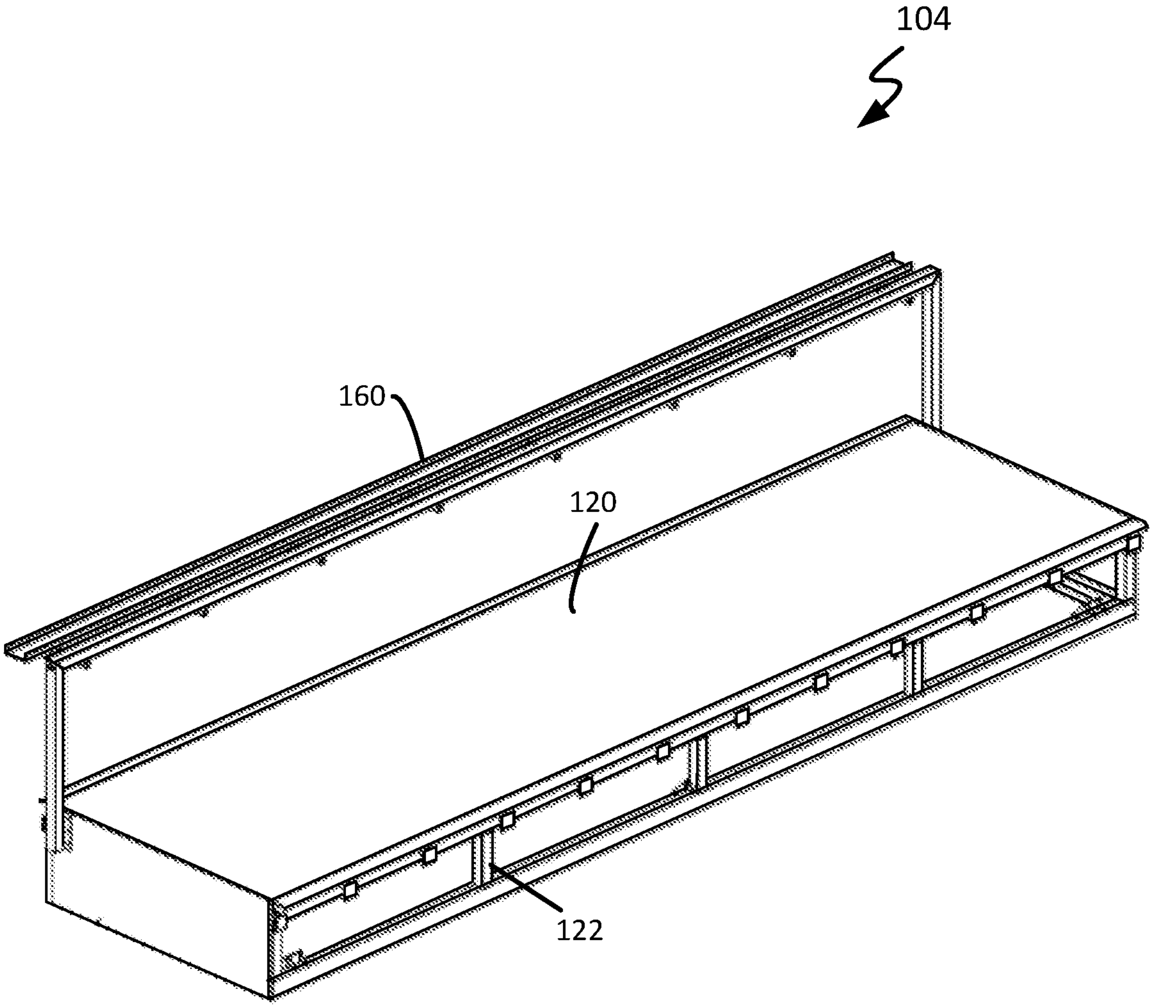
FIG. 2A is a perspective view of a table of the fabrication workstation, in accordance with an embodiment of the present disclosure.

The table 104 includes a work surface 120 on which railing pieces are positioned and arranged prior to joining the pieces to one another. Once positioned relative to each other, the railing pieces are physically assembled with one another (e.g., welded together) while on the work surface 120. The work surface 120 can be of any suitable dimensions so long as the work surface 120 is sufficiently sized to allow an assembly pattern to be deposited and an assembly (e.g., a metal railing) to be constructed thereon. In one example, the work surface 120, as shown in FIG. 2A, is a single piece of material (e.g., steel) positioned in a horizontal plane and supported by the base 122. In other applications, the work surface 120 can be made from multiple pieces or positioned above the base 122 (or both). Materials, such as carbon steel or stainless steel, can be used to manufacture the work surface 120. The work surface 120 can also be manufactured in a variety of shapes and sizes, depending on a given application. In one example, the work surface 120 is a continuous surface manufactured with a rectangular shape with dimensions of 7.5 feet in width, 30 feet in length, and ¾ of inch in thickness, including a width of at least 5 feet, at least 6 feet, at least 7 feet, and including a length of at least 10 feet, at least 15 feet, at least 20 feet, at least 25 feet, and subranges of width and length between these values. The weight of the work surface 120 having such dimensions can range from 6900 to 7100 pounds. In some examples, the work surface 120 can have a thickness of ⅛, 3/16, ¼, 5/16, ⅜, or 7/16 inch. The thickness of the work surface 120 can be selected to provide the desired ability to resist flexing under a load, as will be appreciated. In addition, the work surface 120 is a substantially flat surface. Discontinuities or raised areas in the work surface 120 may adversely affect the layout and/or fabrication of the railing assembly. In one example, the work surface 120 has a flatness, such that placing a 36-inch rule along work surface 120 creates a gap of no greater than 5/16 inch between the rule and work surface 120, including no greater than ¼ inch, no greater than ⅛ inch, or other suitable degree of flatness. In some embodiments, the required flatness of the work surface is dictated at least in part by the components to be assembled. For example, for a railing that includes upper and lower rails connected by balusters all of the same diameter, a work surface 120 that does not meet the flatness requirement can result in difficulty properly aligning the components. Numerous other work surface configurations will be apparent in light of the present disclosure.

Figure 2B:
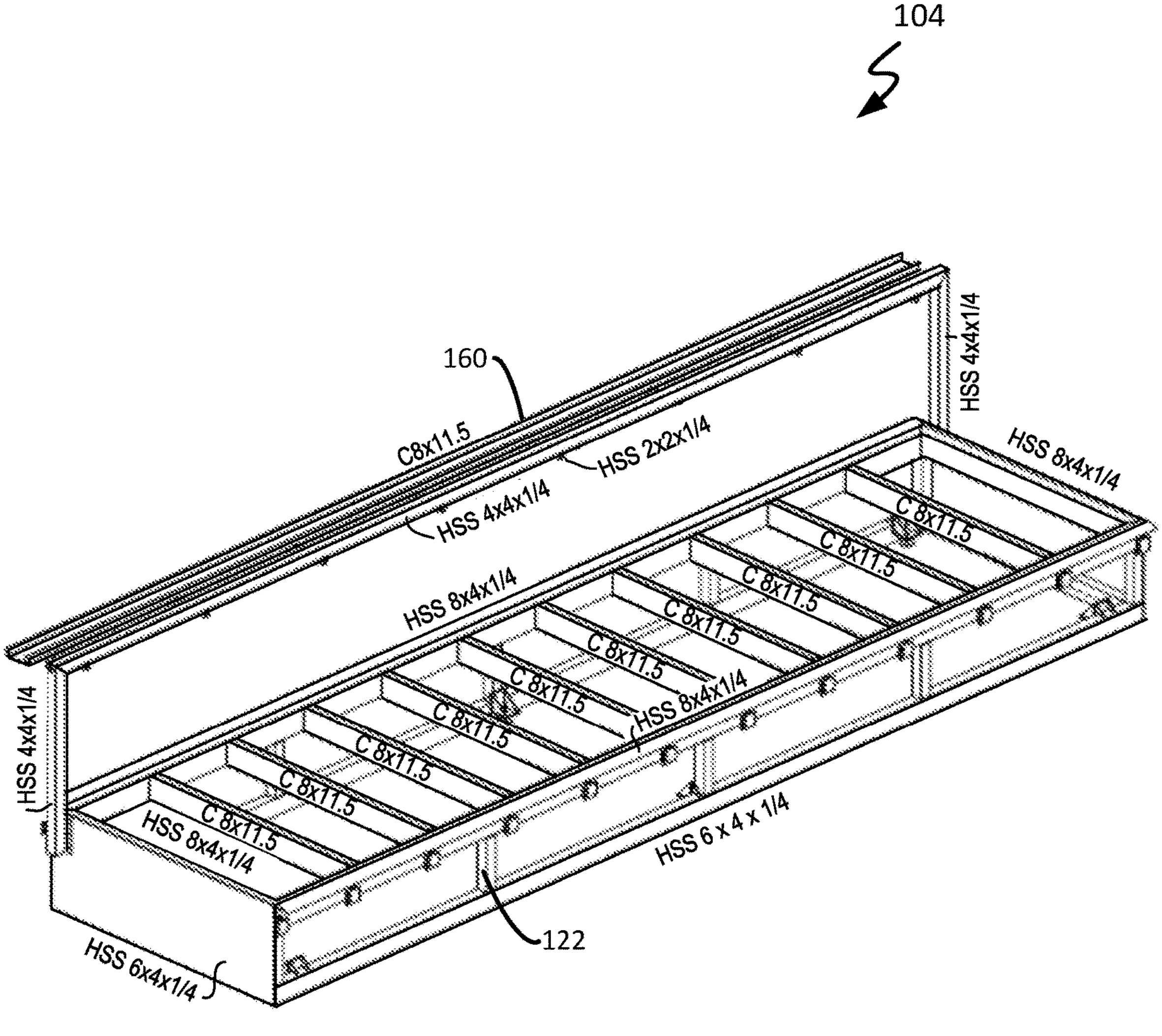
FIG. 2B is a perspective view of the table shown in FIG. 2A with the work surface removed, in accordance with an embodiment of the present disclosure.

A base 122 supports components of the fabrication workstation, including the work surface 120 and beam 108. Thus, the base 122 is robustly designed so that its mechanical properties are sufficient to properly support the work surface 120 and other components attached thereto. In one example, the base 122, as shown in FIG. 2B, is made from hollow structural sections (HSS) (e.g., 6"×4" and 8"×4" rectangular sections) and channel pieces (e.g., C8 channel). In particular, the hollow structural sections can be manufactured from steel having a thickness of ¼ inch and a nominal weight of 15.62 lb./ft. In other examples, the sections can be square or round sections with a thickness in the range of 3/16 to ½ inch. The channel pieces, in this one example, can be structural steel channel manufactured from carbon steel and including dimensions of 8 inches in height, 2.260 inches in flange width, 0.220 inches in web thickness, and a nominal weight of 11.5 lb./ft. The channel pieces can be attached to an inside surface of the hollow structural sections using rivets or bolts or by welding. As can be seen, the channel pieces are unitary pieces that span the distance between the interior surfaces of the beams of the base 122 and are positioned uniformly along a length of the base 122. In some examples, the channel pieces are positioned parallel to one another along the length of the base 122 at a distance of 2 feet and 8 inches. In other examples, the channel pieces are spaced from one another by a distance ranging from one to three feet. The base 122 includes roughly the same dimensions as the work surface 120 (e.g., 29 feet, 4.25 inches in length and 7 feet, 5.25 inches in width). The base 122 may have a height sufficient to position the work surface 120 at a convenient height above the floor for a person to work. In one example, the base 122 positions the work surface 120 at a height of approximately 32 inches above the floor. In other examples, the work surface 120 can be at a height between 26 and 36 inches above the floor.

The table 104 also includes guide rails 124 configured to guide the movement of the beam 108 along the work surface 120 in a first direction (e.g., y-direction). In general, the guide rails 124 are attached to opposing sides of the table 104 and together form a track on which the beam 108 moves. The guide rails 124 can be manufactured from materials, such as aluminum, carbon steel, or stainless steel. In one example, the guide rails 124 include a gear rack 128 that extends along the length of each guide rail 124, where each gear rack 128 is configured to engage a pinion gear attached to a gear box, as will be described in more detail below.

The guide rails 124 may also include mechanical stop and/or electrical interlocks to prevent the beam 108 from moving off ends of the guide rails 124. In one embodiment, each end of the guide rail 124 includes a mechanical stop 132 or a limit switch 136 configured to prevent the pinion from moving off the gear rack 128. In some instances, both mechanical stops and electrical interlocks are located at each end of the guide rails 124 in the event of a power failure or a failure of the mechanical stop. The mechanical stops 132 can be any physical structure or device capable of preventing movement of the beam 108 along the guide rail 124. In one example, the mechanical stop 132 is a plate with an adjustable bumper. A limit switch 136, such as a proximity switch, can be also be used to prevent movement of the beam 108 along the guide rail 124. For example, a proximity sensor or limit switch 136 detects the presence of an object without physical contact between the limit switch 136 and the object. Upon detecting the object, the limit switch 136 transmits a signal to electrically disable the object from moving in the direction of limit switch 136. In one example, the limit switch 136 is an inductive proximity sensor. In other examples, the limit switch 136 can be a capacitive or photoelectric sensor.

In some embodiments, the guide rails 124 are adjustable using one or more adjustors 140 attached to the base 122. For example, each adjustor 140 is configured to adjust the position of a portion of the guide rail 124 adjacent the adjustor to ensure that the guide rail 124 is straight along its entire length. Flexing, bending, waviness, or distortion of the guide rail 124 can cause the pinion gear of the motor to bind with the gear rack 128, and thus slow or otherwise stop the movement of the beam 108. In one example, each adjustor 140 includes a steel plate welded to the base 122 and extending horizontally outward from the base 122. Each plate has a threaded hole to receive a fastener, such as a bolt, in a vertical direction through the plate. The bolt is threaded into the hole so that it contacts a bottom side of the guide rail 124, for example. Advancing the bolt against the guide rail 124 causes the guide rail 124 to move upward, and thus raises that portion of the guide rail 124. The position of a portion of the guide rail 124 can be adjusted by threading the bolt into or out of the plate as needed.

In some embodiments, guards 144 are positioned above each of the guide rails 124 to prevent debris from falling onto the guide rails 124 during fabrication of the railing assembly and to prevent access by persons or objects while the beam 108 is being moved along the guide rails 124. In one example, each guard 144 is positioned above a guide rail 124 and is removably attached to the base 122 using fasteners, such as bolts or screws. The guards 144 can be manufactured from materials, such as ¼-inch thick diamond plate stainless steel. In other examples, the guards 144 can be manufactured from carbon steel, stainless steel, or aluminum. In this example, the guards 144 have a horizontal dimension of approximately 4 four inches. In other examples, the guards 144 can have a greater or smaller horizontal dimension depending on the off-set distance of the guide rails 124 from the base 122.

In some embodiments, the table 104 further includes a grounding lug 148 configured to transfer electrical energy received by the work surface 120 (e.g., an arc strike) to ground. The grounding lug 148 allows the railing assembly to be safely fabricated on the work surface 120 without risk of electrical shock caused by an unintended transfer of electrical energy from tooling, such as a welding machine, to the work surface 120. In general, a grounding lug provides an electrical path to ground in which the flow of electricity experiences the least resistance. In one example, the grounding lug 148 is an electrical connector made of out of conductive material, such as copper. The grounding lug 148 is attached to a surface of the base 122 with a fastener (e.g., a bolt or cap screw). In addition, the grounding lug 148 is attached to the base 122 such that there is sufficient contact between the base 122 and grounding lug 148 (e.g., metal to metal contact) to allow electrical energy to transfer from one to the other. Attached to the grounding lug 148 is a grounding wire that is connected to ground.

The table 104 also includes beam supports 150 that operatively couple the beam 108 to guide rails 124. In one example, the beam supports 150 are manufactured from materials, such as carbon steel, stainless steel or aluminum. Each beam support 150 is configured to receive an end of the beam 108, such that the beam is fixed to beam supports 150 on opposite sides of the table. The beam 108 can be attached to each beam support 150 using fasteners and/or mechanical clamps. The lower end of each beam support 150 is configured to engage guide rails 124 to maintain the beam 108 a fixed distance above the work surface 120 and allow the beam support 150 to move along the guide rails 124. In one example, the beam support 150 may include one or more linear bearings that are configured to ride or slide along a track of the guide rails 124. Attached to one of each beam support 150 is a cable conduit 156. The cable conduit 156 carries or otherwise supports electrical cables needed to power electrical components positioned on the beam 108. The cable conduit 156 maintains the cables together and protects them from physical damage. In one example, the cable conduit 156 is made out of sheet metal and has a length of 5 feet and width of about 6 inches. The cable conduit 156 receives cabling from the cable tray 160, as will be described further herein. In other embodiments, the cable conduit 156 is a segmented conduit configured to coil or bend as the beam 108 moves along the work surface 120.

The beam supports 150 move relative to the work surface 120 using motors and gear boxes. For instance, each beam support 150 contains a motor 152A and a gear box 154A to move the beam support 150 and beam 108 linearly along a length of the table 104. Other components, such as ink dispenser system or marking device 112, also move using motors and gearboxes. For example, the marking device 112 moves along beam 108 using motor 152B and gear box 154B. The motor can be any type of motor that is of suitable size to move components on which it is attached. In one example, the motor is a synchronous servomotor. In particular, the motor can be a brushless three-phase AC motor. In other examples, the motor can be a hydraulic or pneumatic motor. Attached to the motor is a gear box, such as a low-backlash planetary gearhead, configured to increase torque provided by the motor. Attached to an output shaft of the gearbox is a pinion a gear configured to mesh with or otherwise engage the gear rack 128. Vertical movement of the marking device can be accomplished in similar fashion, although the power requirement to move the marking device vertically into and out of contact with the work surface is relatively low compared to the power required to move the beam along the table, as will be appreciated.

The table 104 optionally includes a plurality of encoders 155 to determine the position of movable components, such as beam supports 150 and marking device 112. The encoders 155 can prevent damage to table components caused by misalignment of movable components, such as the beam supports 150, during operation. In one example, the encoders 155 are rotary encoders that convert angular position or motion of a shaft into a signal. The signal generated by the encoder to can be transmitted to the control panel 116 for processing. The signal is processed to determine speed, distance, and/or position of the beam along the work surface 120.

The table 104 also includes a cable tray 160 to support cabling connected to components attached to the beam supports 150 and/or beam 108. In addition, the cable tray 160 also guides the cabling as the beam 108 moves along the work surface 120. In one example, the cable tray 160 is made from 6×4 carbon steel square tubing. In one example, the cable tray 160 can be positioned above the beam supports 150 and attached to the base 122 at both ends. The cable tray 160 is located above the table 104 so that fabricators can stand adjacent to the table 104 as they fabricate a railing assembly positioned on the work surface. In this one example, the cable tray 160 is positioned approximately 7 feet above the floor, so that a person can comfortably stand beneath the cable tray 160. In operation, as the beam 108 is moved along the work surface 120 (e.g., in the y-direction), the cabling is either placed into or removed from the cable tray 160, depending on direction in which the beam 108 moves.

The fabrication workstation 100 further includes a beam 108 to which the marking device 112 is mounted. The marking device 112 can be an ink dispenser, an ink nozzle, a felt-tip ink pen, a piece of chalk, a pencil, a print head, or some other suitable marking device. The beam 108 supports all or a portion of the marking device 112 over the work surface 120 of the table 104. In addition, the beam 108 also guides the marking device 112 as it moves across the work surface 120 in a second direction (e.g., X-direction) different from the first direction (e.g., Y-direction). In one example, the beam 108 is made of aluminum and has a length of approximately 7.5 feet and includes a track. The marking device 112 can move along the track. The beam 108 also includes a gear rack 128 similar to gear rack 128 on guide rails 124. The gear rack 128 interfaces with a pinion gear located on a motor 152B attached to the marking device 112 to move the marking device 112 along the track of the beam 108, as will be described further herein.

In some embodiments, the marking device 112 is configured to dispense ink onto the work surface 120 of the table 104, by spraying, flowing, or feeding ink to the work surface 120, for example. The ink can be deposited onto the work surface 120 in a pattern, such as an outline of a railing assembly. The pattern can be used to quickly and efficiently layout the components of the railing assembly relative to one another without necessitating multiple measurements between components. The marking device 112 can also dispense ink by direct contact with the work surface, as in the case of a felt-tip marker or pen. In one embodiment, the marking device 112 includes a nozzle 164 and an ink reservoir 168. The nozzle 164 is configured to deposit ink onto the work surface 120 of the table 104. For example, the nozzle 164 is pneumatically operated. For example, the nozzle 164 is moved vertically into contact with or to close proximity with the work surface 120 in response to an air input. In one such embodiment, a pneumatic drive is used to move the marking device vertically along a vertical track attached to the beam. Pneumatic pressure can also be used with a nozzle to dispense ink onto the work surface 120. The nozzle 164, in some examples, can remain at a constant distance above the work surface 120 while ink is deposited onto the work surface 120. When the air input is removed, a spring attached to the nozzle 164 causes it to move away from the work surface 120 to its initial position above the work surface 120. The marking device 112 also includes an ink reservoir 168 to hold a supply of ink. In one example, the ink reservoir 168 is a plastic container capable of holding a one or two gallons of ink. The ink reservoir 168 can be located adjacent to the nozzle 164 on the beam 108 or at one end of the beam 108. No matter its location, the ink reservoir 168 may include a pump to move the ink to the nozzle 164.

The fabrication workstation 100 further includes a control panel 116 configured to allow an operator to control the fabrication workstation 100. In one example, the control panel 116 includes a personal computer (PC) with a motherboard including memory, a processor, and a heat sink. The control panel 116 may also include a memory, such as volatile or non-volatile memory, to store electronic files, such as files of a railing pattern database. Within the control panel 116 is a display, such as a 15, 19, or 24-inch display, configured as either a touch screen or non-touch screen display. The display is configured to present a graphical user interface (GUI) for operating or otherwise controlling the function of the fabrication workstation 100. The GUI enables an operator to select a particular pattern to be deposited onto the work surface 120. The patterns can be selected from a database of patterns or can be imported from another application (e.g., a CAD software application). Moreover, the GUI is configured to allow an operator to adjust the operation of the fabrication workstation 100. Using the GUI, the operator can adjust one or more characteristics of the fabrication workstation 100 to improve pattern quality or adjust the amount of time to create a pattern. Characteristics that may be adjusted via the GUI include the amount of ink deposited onto the work surface 120 (e.g., thickness of the lines of the pattern), the speed at which components move (e.g., the marking device 112 and beam 108), and the location on the work surface where the pattern is made. In some instances, the control panel 116 may be configured with a track pad, keyboard, or other input device.

The display may also include one or more function buttons. The function buttons may be physical buttons located adjacent to the display or virtual buttons of the GUI (or both). In one example, the display includes a power button to turn on the fabrication workstation 100. Additional function buttons may include operating buttons (e.g., start/stop buttons) that control the operation of the fabrication workstation 100. The control panel 116, in some examples, may also include an emergency stop switch. In one example, the emergency stop switch is a push-button switch that turns off electricity to the fabrication workstation 100 upon being actuated. Numerous other control panel configurations will be apparent in light of the present disclosure.

Operation of a Fabrication Workstation

The fabrication workstation 100 is configured to deposit ink directly onto the work surface 120 of the table 104 in an assembly pattern, such as a railing design. After defining the assembly pattern on the work surface, railing pieces are placed on the work surface 120 according to the assembly pattern to facilitate assembly. The control panel 116 can receive user input selecting an assembly pattern to be marked on the work surface 120. In some cases, the user input is a selection for an assembly pattern, resulting in the control panel 116 retrieving and/or loading the selected assembly pattern. The user input can be received remotely from a server or computing device in communication with the control panel 116, such as via a network (e.g., a wired or wireless network) connected to the control panel 116. After receiving the input for selecting the assembly pattern, the control panel 116 activates the fabrication workstation 100, which can include reading the assembly pattern and moving the marking device to a starting position. If the fabrication workstation 100 was previously turned-off, then the control panel 116 can reset the encoders 155 by first positioning the beam 108 and marking device 112 to a known location (e.g., at one end of the work surface 120 and one end of the beam 108) and then resetting the encoders 155 to a known value (e.g., zero) associated with that location. For example, in response to input received, the control panel 116 moves the beam 108 and marking device 112 individually or together to a location where the encoders 155 can be reset. In other instances, the control panel 116 executes a sub-routine to position the beam 108 and marking device 112.

With encoders 155 reset, the control panel 116 positions the beam 108 and marking device 112 at a suitable start position along the work surface 120 to begin drawing or dispensing ink to define assembly pattern on the work surface 120. For example, the control panel 116 transmits one or more signals to the motors so that the marking device 112 is positioned at coordinate locations (e.g., (x, y)) along the work surface 120. As the beam 108 and marking device 112 move, the encoders 155 generate position data (e.g., a count or number of clicks) that can be used by the control panel 116 to determine a position of the marking device 112 relative to a previous position or a reference point on the work surface 120. A reference point is a point within the area of the work surface 120 that defines a coordinate position of the marking device 112. The reference point can be located at the center of the work surface 120 or at one corner of the work surface 120, with coordinates of 0, 0 at that location, for example. The reference point can be the same as the known location at which the encoders 155 were reset. The reference point can also be a particular location within the work surface 120, such as a point along a central axis. The signal generated by the encoders 155 can be transmitted to control panel 116 so that the control panel 116 can determine a next component movement or can monitor the operation of the fabrication workstation 100. For example, the encoders 155 can be configured to ensure that the beam supports 150 remain parallel with one another as they move along the guide rails 124. If the beam supports 150 become displaced from one another beyond a particular tolerance value (e.g., 1/32, 1/16, 1/8 of an inch), then one or both the pinion gears attached to the motors may bind, and thus prevent the beam supports 150 and beam 108 from moving. Data from the encoders 155 received at the control panel 116 can be used by the control panel 116 to prevent the beam supports 150 from becoming misaligned with one another. For example, the controller uses encoder data to continuously or periodically determine the position of each beam support 150. Processors of the control panel 116 can analyze the position data to determine any difference in position between each of the beam supports 150. If a difference is found, then the control panel 116 determines whether the difference is within an acceptable range. The control panel 116 detecting misalignment outside the acceptable range, based on received encoder information, can result in the fabrication workstation 100 ceasing operation to prevent damage to the one or more components of the fabrication workstation 100.

In some examples, the control panel 116 is configured to process the signal from the encoders and to send commands to move components or deposit ink (or both) along the work surface 120. When executing according to this configuration, one or more processors of the control panel 116 analyze the selected pattern to determine a sequence of movements for each of the beam 108 and marking device 112. The sequence of movements can be continuous or a series of steps. The beam 108 and marking device 112 move to produce the assembly pattern on the work surface 120 using motors that receive signals and/or commands from the one or more processors of the control panel 116. For example, the beam 108 and marking device 112 can be moved in series with one another, such that the beam 108 moves along the work surface 120 first, and then the marking device 112 subsequently moves along the beam 108. In other examples, the marking device 112 moves along the beam 108 and the beam 108 moves along the work surface 120 at the same time to deposit the ink onto the work surface 120. Ink can be deposited onto the work surface 120 during movement or upon completion of a component movement. For instance, ink can be deposited while the beam 108 moves, but the marking device 112 is stationary relative to the beam 108. In other instances, the marking device 112 moves along beam 108 as it deposits ink onto the work surface 120, but the beam 108 is stationary. In yet other instances, both the beam 108 and marking device 112 move while ink is deposited onto the work surface 120. In such an instance, the beam 108 moves in a first direction (e.g., a y-direction) and the marking device 112 moves in a second direction (e.g., x-direction) relative to the beam 108. In yet other instances, the nozzle 164 of the marking device 112 may also move relative to the beam 108 in a third direction (e.g., z-direction). In some examples, the one or more processors analyze the selected assembly pattern to determine a sequence that has the least number of component movements to deposit ink onto the work surface 120. In other examples, the assembly pattern is analyzed to determine a sequence of movements that optimizes (e.g., uses the least amount of) electricity, ink, time, or a combination of these factors, based on the configuration and device components.

In addition, limit switches 136 can be used to prevent movement of the beam 108 or marking device 112 outside an operating range of motion. In particular, the limit switches 136 can be configured to generate a signal when the beam 108 or marking device 112 is within a predefined range. For example, the limit switch 136 transmits the signal to the control panel to stop operation of the detected component when the beam is outside of the permitted operating range. The operating range defines limits for operating the beam 108 and marking device 112 at their extreme ends of travel where component performance and reliability can be reduced. In one example, the operating range is a portion of an area within the work surface 120 (e.g., area about the center of the work surface 120). The operating range can be defined by the position of the limit switches 136 along the table 104. In response to receiving a signal, the limit switch 136 is configured to send an input to the control panel 116 to prevent the detected component (e.g., the beam 108 or marking device 112) from moving further in that direction. In the event of a failure of the limit switch 136, mechanical stops 132 located at each end of guide rails 124 can physically prevent further movement of the component.

The fabrication workstation 100 can deposit one or more assembly patterns onto the work surface 120, depending on the size of the individual patterns and the work surface 120. An assembly pattern can be for a railing, staircase, roof truss, fence, or other assembly. Multiple patterns can be deposited onto the work surface 120 concurrently in a single job or in separate jobs occurring one after another, depending on the application. Once deposited, multiple railing assemblies can be fabricated concurrently on a single table 104 using each pattern on the work surface 120. The patterns can be made using solid or dotted ink lines. Dotted lines may be preferable because less ink can be used to create the pattern without adversely affecting the appearance of the pattern on the work surface 120. The pattern can be an outline of the structure to be assembled, such as an outline of a railing. Generally, an outline is a line or set of lines that enclose or indicate the shape of an object. The outline can be the same size of an actual railing assembly to be fabricated so that railing pieces can be placed on the outline to form the railing assembly. The outline may be a partial or complete outline of the railing assembly. For example, a partial outline may include lines at the ends of individual pieces and/or at the intersection of two or more pieces. In such an example, the outline may not include lines that correspond to portions of railing pieces between the ends of each piece. In other examples, single lines can be used to form the assembly pattern on the work surface 120. For instance, the assembly pattern can include single lines that represent each piece of the assembly. The pieces are positioned onto the work surface 120 so that they are centered on each line of the assembly pattern. In other instances, the single lines of the assembly pattern can be offset, such that each piece of the railing assembly is position with one edge of the piece positioned over the line. Numerous other embodiments and applications will be apparent in light of the present disclosure.

Figure 3:
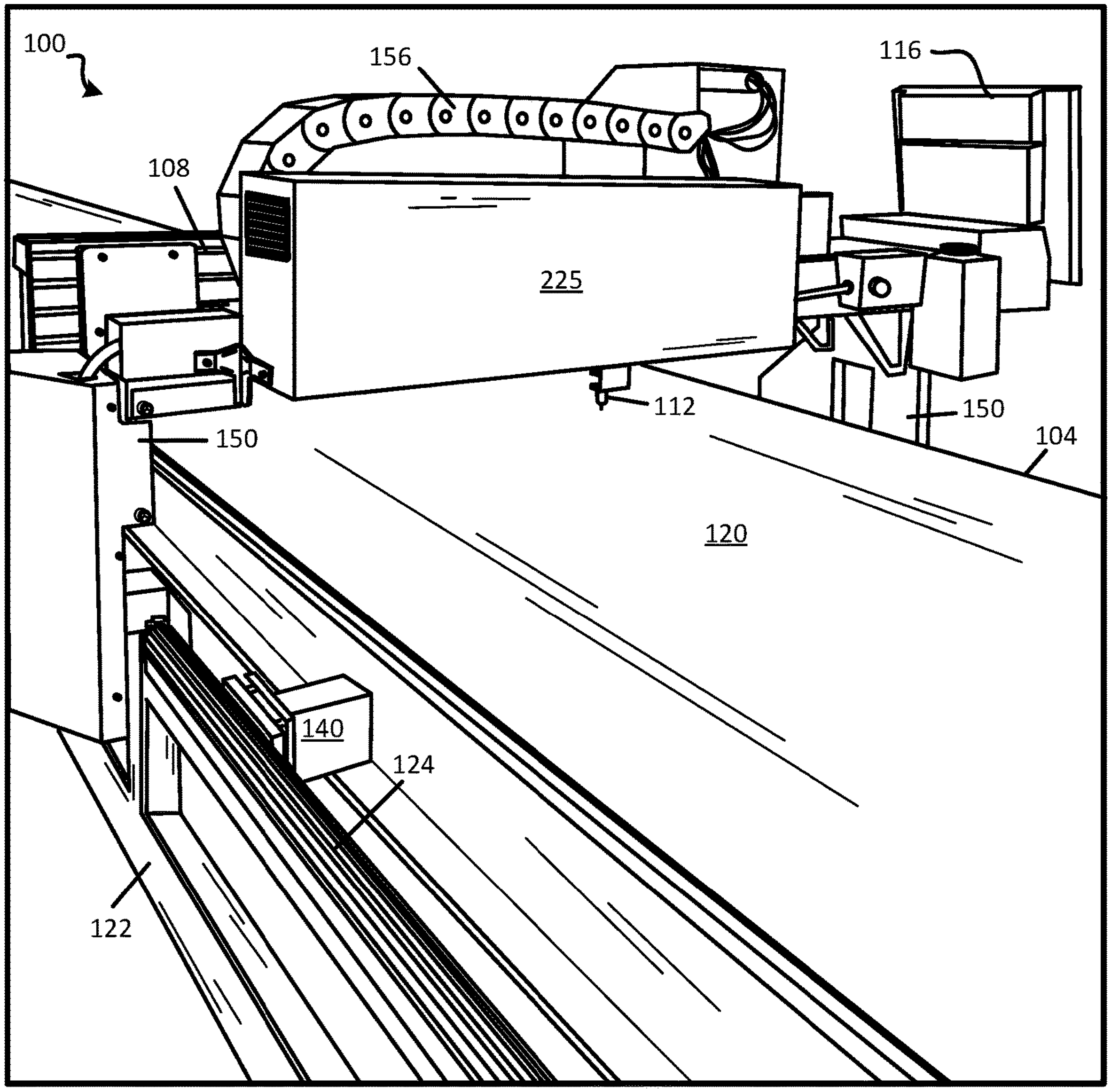
FIG. 3 illustrates a perspective view showing a portion of a fabrication workstation with a beam extending over the metal work surface, in accordance with an embodiment of the present disclosure.

Referring now to FIG. 3, a perspective view shows part of a fabrication workstation 100 that includes an electrical cabinet 225 attached to the beam, in accordance with an embodiment of the present disclosure. As with some embodiments discussed above, the fabrication workstation 100 includes a table 104 with a work surface 120 supported on a base 122. In this example, the work surface 120 is made of metal, such as steel. A beam 108 extends crosswise to the work surface 120 between beam supports 150 on opposite sides of the table. The beam 108 can move longitudinally along the work surface 120 on guide rails 124 that extend along opposite sides of the table 104. An adjustor 140 mounted to the side of the table 104 is oriented to adjust lateral spacing between the table 104 and the guide rail 124 by advancing or retracting bolts in a horizontal direction.

The electrical cabinet 225 encloses electrical components used to operate the fabrication workstation 100, including fuses, breakers, power supplies, servo motor controllers, and wiring. The electrical cabinet 225 receives control signals from the control panel 116 and outputs electrical power to motors to move the marking device 112 along the beam 108 and to move the beam 108 along the table 104. A flexible, segmented cable conduit 156 contains cables connected to motors moving the marking device 112 along the beam.

An advantage of locating the electrical cabinet 225 on the beam 108 is a reduction in the amount of wiring (and therefore cost) compared to a layout device that has the control panel located on an end of the table 104. Another advantage of locating the electrical cabinet 225 on the beam 108 is a reduction in overall length of the fabrication workstation 100. For example, compared to workstations having the electrical cabinet located at one end of the table 104, the fabrication workstation 100 with electrical cabinet 225 on the beam 108 is about a foot shorter, with no reduction in area of the work surface 120. Also, the end of the table previously occupied by the electrical cabinet 225 is now free for workers to, for example, access the work surface 120 and to load assembly components onto the work surface 120. For example, a completed assembly can be unloaded from either end of the work surface 120 or from a side of the work surface 120, facilitating transfer of heavy assemblies.

Figure 4:
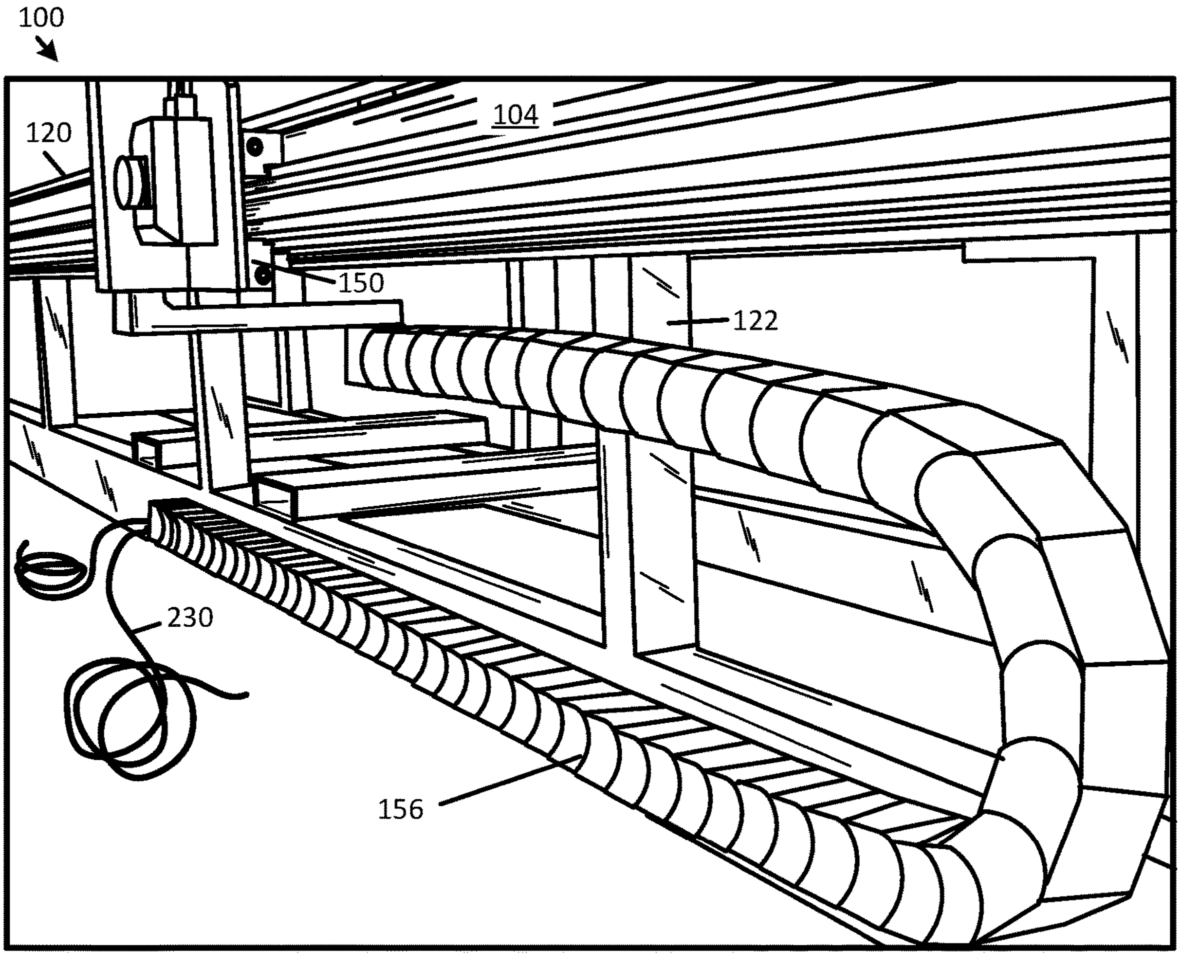
FIG. 4 illustrates a perspective view of the table support and electrical connections below the work surface, in accordance with an embodiment of the present disclosure.

FIG. 4 illustrates a perspective view showing a base 122 and cable conduit 156 below the work surface 120 of a fabrication workstation 100, in accordance with an embodiment of the present disclosure. The cable conduit 156 is a flexible, segmented conduit that permits electrical cables 230 to coil and/or move in a controlled manner with the beam 108 as the beam 108 moves along the table 104.

In some embodiments, the fabrication workstation 100 operates using a ~408-volt power supply. In other embodiments, the fabrication workstation 100 operates using a single phase power supply from 200 volts to 250 volts, such as 208 volts, 220 volts, 240 volts, or about 208-240 volts, depending on the particular supply voltage. An advantage of operating with the 208-240 v power supply is the ability to locate the fabrication workstation 100 in a small shop, garage, or area of a warehouse equipped with a standard electrical plug for that voltage, compared to relying on having a specialized 408-volt, 3-phase power supply and the associated transformer. In some situations, running electrical cable from the transformer to the workstation can involve significant distance, which results in a loss of voltage and therefore a loss of power at the motors. The use of a single-phase power in a range from about 208 volts to about 240 volts avoids this problem. As will also be appreciated, 408 volt, 3-phase power is not available in some regions. Using power supply of 208-240 volts also requires a smaller gauge of electrical cable, thereby reducing cost and facilitating placement of such cable.

Methodology of Railing Assembly Fabrication

Figure 5:
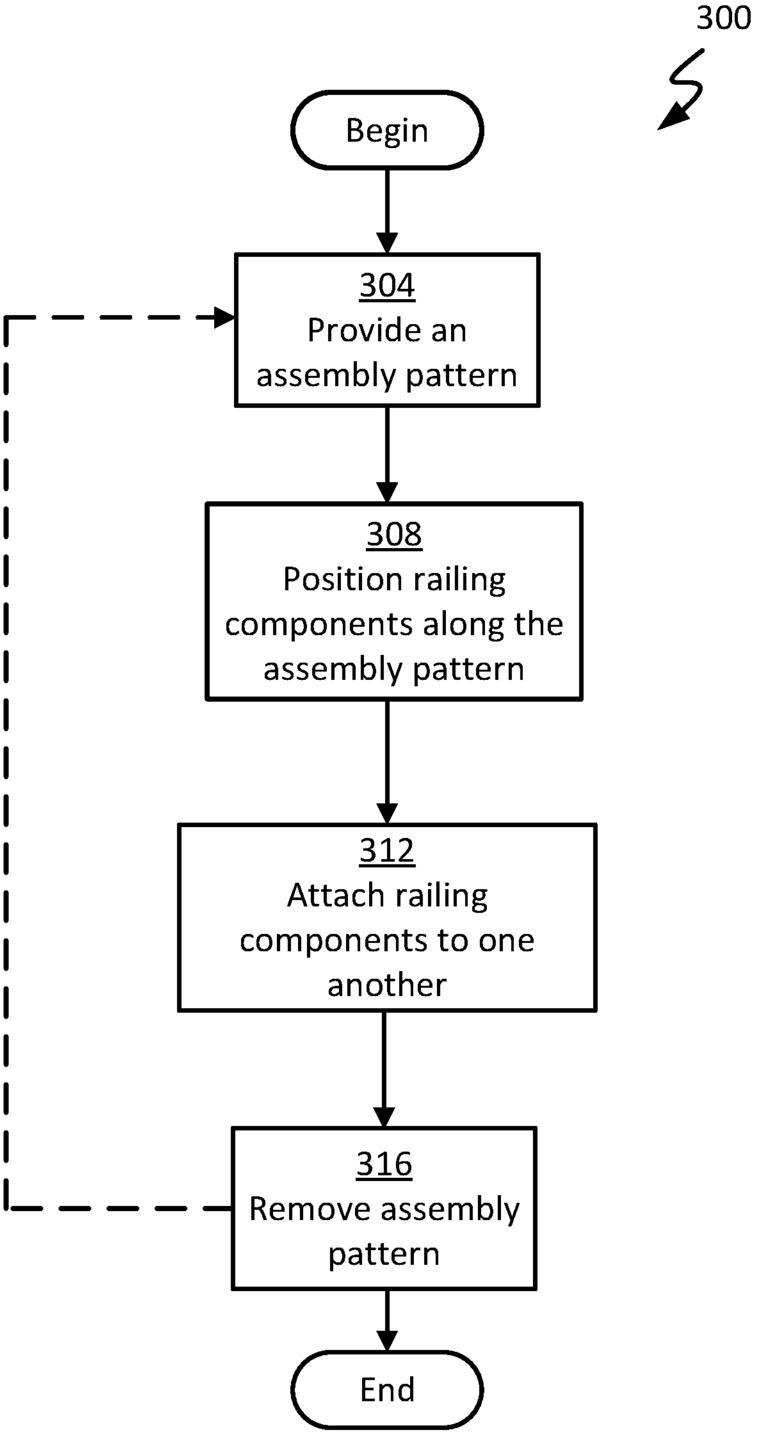
FIG. 5 is a flow chart illustrating a method for fabricating a railing assembly, in accordance with an embodiment of the present disclosure.
Figure 6A:
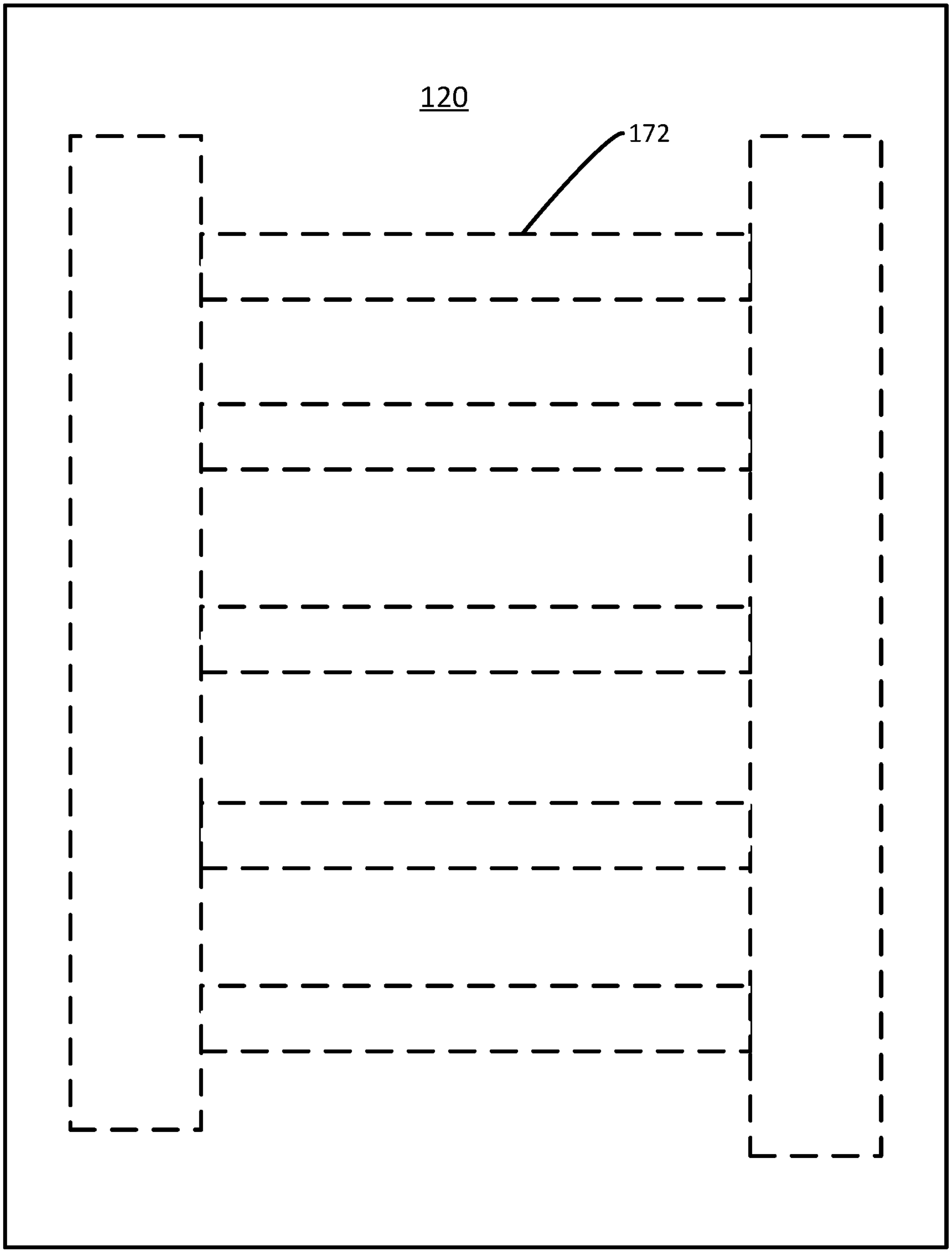
FIG. 6A is a schematic view of a pattern deposited onto work surface of a metal fabrication workstation, in accordance with an embodiment of the present disclosure.

FIG. 5 is a flow chart showing a method 300 for fabricating a railing assembly, in accordance with an embodiment of the present disclosure. The method 300 includes providing 304 a first pattern of the railing assembly on a work surface of a table. In one example, an operator can select a desired pattern using a GUI displayed within a touch screen display of a control panel. The pattern can be selected from a database of railing assembly patterns or imported from another application (e.g., a CAD software application). Thus, standard or custom railing assembly patterns can be selected depending on a given application or customer preference. With the pattern selected, the operator using the control panel can initiate a series of routines and subroutines in which the ink dispenser deposits ink onto the work surface 120 in a pattern 172 as shown in FIG. 6A, for example.

Figure 6B:
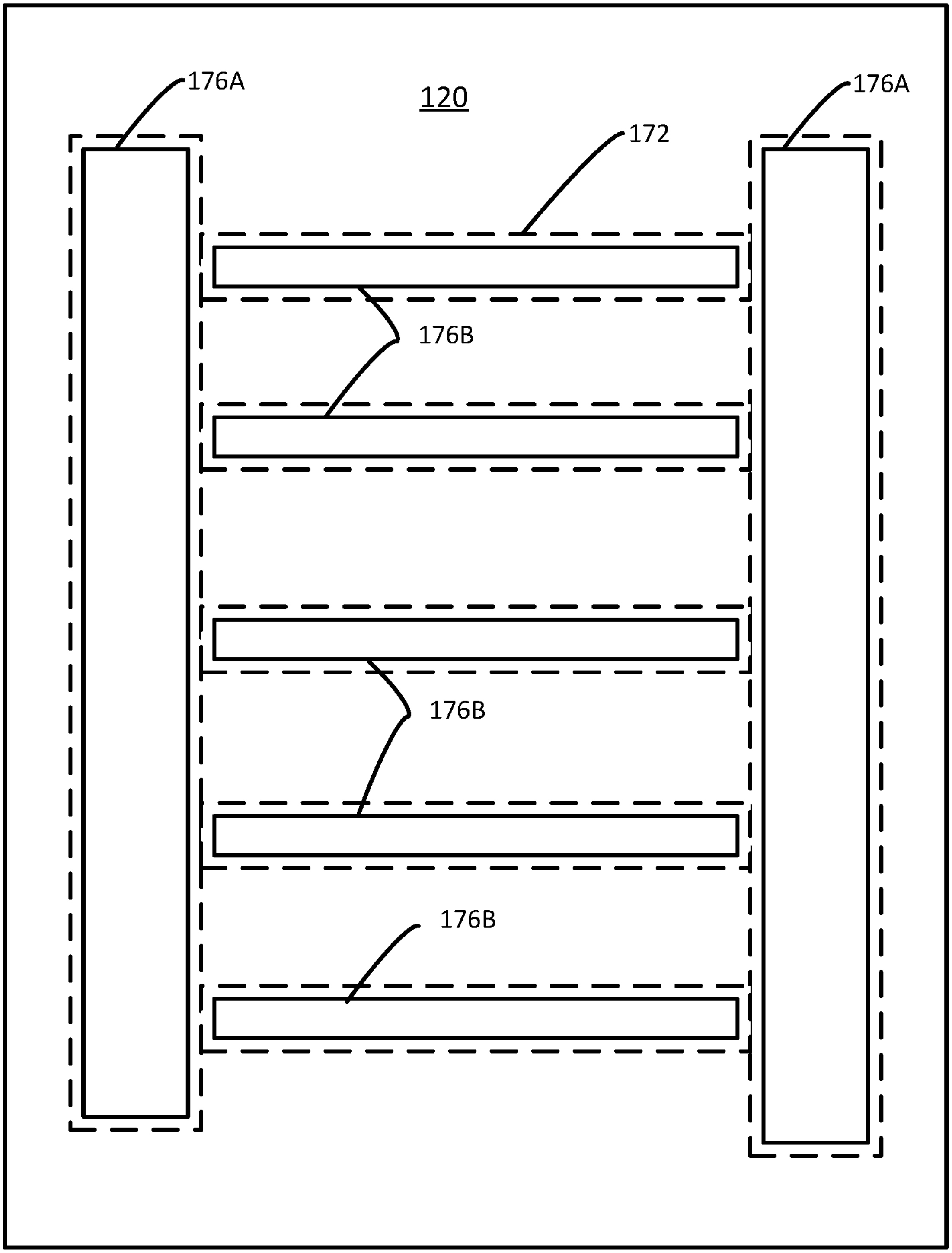
FIG. 6B is a schematic view railing pieces positioned within a pattern on the work surface of the metal fabrication workstation, in accordance with an embodiment of the present disclosure.

The method 300 further includes positioning 308 a plurality of railing components along the first pattern on the work surface. Once formed on the work surface, the railing assembly pattern is used as a guide in which to locate the various pieces of the assembly relative to one another along the table. As shown in FIG. 6B, in one example, the pattern is in the form of an outline of a railing assembly, in which the railing pieces 176A and 176B are positioned within the outline relative to one another. When laid out in this fashion, measurements between railing pieces are not needed because the position of each piece relative to adjacent pieces is defined by the pattern. Thus, the railing pieces can be quickly and efficiently laid out onto the work surface 120 without the necessity of repeated measurements. In addition, when laid out in such a manner, the accuracy of the final design is significantly improved since the fabricator has a visual reference that provides a visual cue or indication that a piece is misaligned or misplaced before two pieces are attached to one another.

Figure 6C:
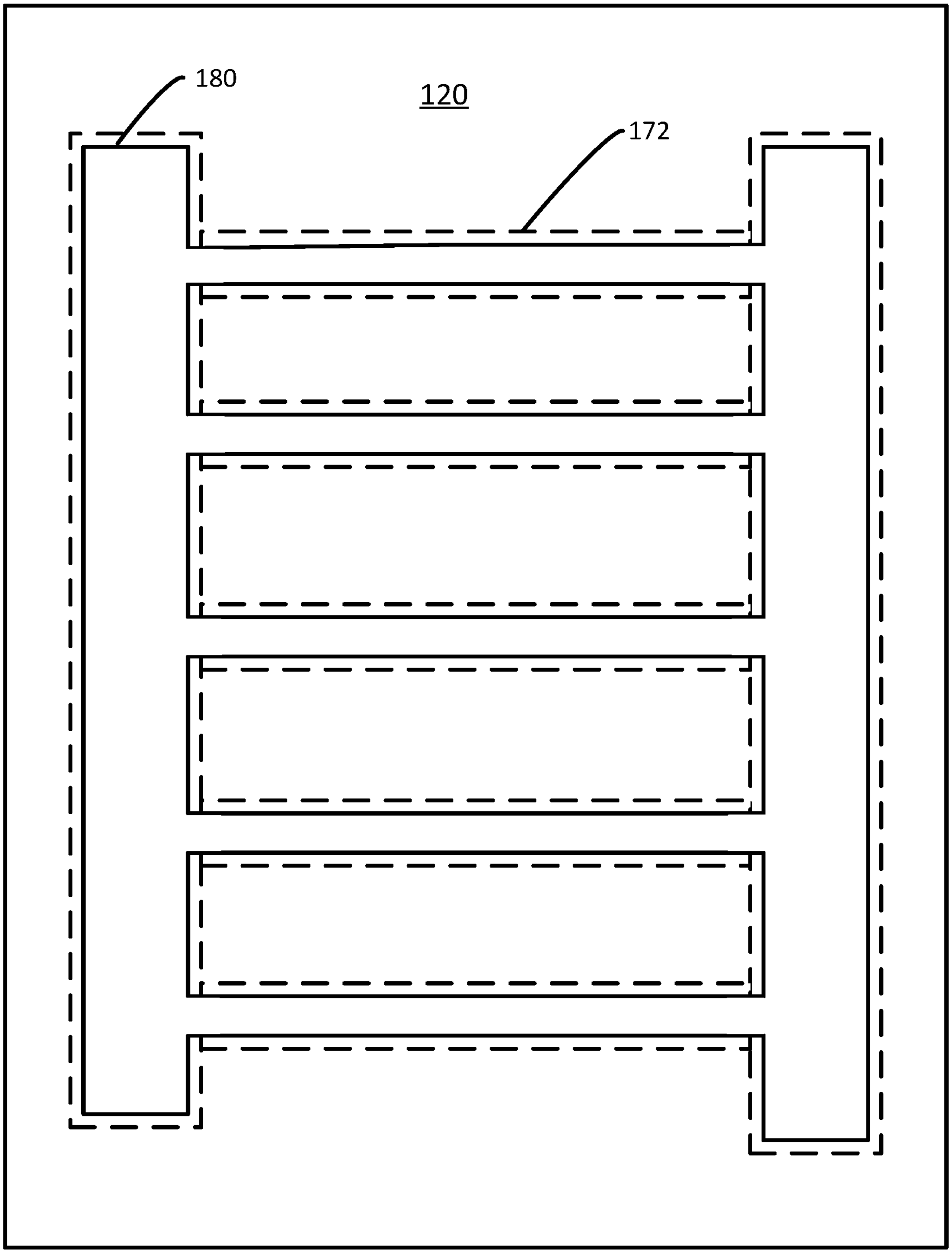
FIG. 6C is a schematic view of a railing assembly produced using the pattern disposed on the work surface of the metal fabrication workstation, in accordance with an embodiment of the present disclosure.

The method 300 also includes attaching 312 the positioned railing pieces to one another to form the railing assembly 180. In one example, the railing pieces are manufactured from metal, such as cast iron or carbon steel, and attached to each other using fabrication techniques, such as welding, brazing, and soldering, to form a railing assembly 180, as shown in FIG. 6C. The railing pieces are attached to one another while positioned on the work surface 120 of the table. The railing pieces can be safely attached together, because the table includes a grounding lug that is configured to transfer any unintended discharge of electrical energy (e.g., an arc strike) received by the work surface to ground. In addition, the work surface 120 provides sufficient clearance to allow one or more fabricators to concurrently fabricate railing assembly 180. The railing assembly 180 can be partially or completely assembled while the railing pieces are positioned on the work surface. For instance, in some examples, the railing pieces can be initially tack welded together while positioned within the railing assembly pattern 172 deposited on the work surface. The railing assembly 180 can next be removed from the table and brought to another location to complete the fabrication of the railing assembly 180. In other instances, the railing pieces can be completely attached to one another while positioned on the work surface 120. In some instances, the railing pieces are first welded on two or more sides so that multiple sides of the joint between two pieces are made. Next, the railing assembly 180 is rotated relative to the work surface 120 to expose the remaining portion of the joints of the railing assembly 180 that were previously not accessible, and thus remain unmade. Once rotated, the newly exposed portions of the joints of the railing pieces can be made.

The method 300 further includes removing 316 the first pattern from the work surface of the table. The first pattern is removed from the work surface so that subsequent patterns can be provided thereon. In some cases, the railing assembly is first removed from the work surface to provide access or to otherwise expose the first pattern on the work surface. In other cases, the railing assembly can remain on the work surface while the first pattern is removed. In such cases, the railing assembly can be positioned to another portion of the work surface that does not include the first pattern. The railing assembly can be positioned on the work surface so that a portion or the entire pattern is exposed. Once exposed, the pattern can be removed by buffing or polishing the work surface with a cleaning detergent or metal polishing compound. The detergent or polishing compound can be applied by hand or using a mechanical device, such as a buffing wheel attached to a hand-held drill. Once the pattern is removed from the work surface, another pattern can be deposited onto the work surface without affecting the appearance of the next pattern.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

What is claimed is:

1. A method of fabricating a metal railing assembly, the method comprising:

providing a workstation comprising a table including a base and a steel work surface on the base, the steel work surface sized and configured to support a plurality of metal railing components of a metal railing assembly;

a beam located above and extending over the steel work surface, the beam extending between and attached to beam supports on opposite sides of the table and each having a lower end movably engaging the table;

a marking device attached to the beam and configured to move along the beam;

one or more motors operable to move the marking device relative to the steel work surface;

a control panel configured to operate the one or more motors to move the marking device relative to the steel work surface and to mark the steel work surface with an assembly pattern for the metal railing assembly;

an electrical cabinet amid the beam, the electrical cabinet configured to receive control signals from the control panel and to output power to the one or more motors; and a flexible electrical conduit positioned below the steel work surface, the flexible electrical conduit housing electrical cable suitable for connecting a line voltage source to the electrical cabinet;

supplying the workstation with between 200 volts and 250 volts of single phase power from the line voltage source via the electrical cable housed in the flexible electrical conduit; and marking the steel work surface, using the marking device, with the assembly pattern for the metal railing assembly.

2. The method of claim 1, wherein marking the steel work surface includes the marking device moving while in direct contact with the steel work surface.

3. The method of claim 1, further comprising moving the marking device in a vertical direction into contact with the steel work surface.

4. The method of claim 1, wherein the assembly pattern is a first assembly pattern, and the method further comprising:

removing the first assembly pattern from the steel work surface; and marking the steel work surface with a second assembly pattern.

5. The method of claim 4, wherein removing the first assembly pattern includes polishing the steel work surface.

6. The method of claim 4, wherein the plurality of metal railing components is a first plurality of metal railing components, the metal railing assembly is a first metal railing assembly, and the method further comprises:

positioning a second plurality of metal railing components on the second assembly pattern on the steel work surface; and attaching the second plurality of metal railing components to one another on the steel work surface to form a second metal railing assembly.

7. The method of claim 1, further comprising:

positioning the plurality of metal railing components on the steel work surface according to the assembly pattern; and attaching one or more components of the plurality of metal railing components to one or more other components of the plurality of metal railing components on the steel work surface to form the metal railing assembly.

8. The method of claim 7, wherein attaching the one or more components to the one or more other components includes welding the one or more components to the one or more other components.

9. The method of claim 1, wherein marking the steel work surface includes defining at least part of an outline of the metal railing assembly.

* * * * *